(12) United States Patent
Bhate et al.

(10) Patent No.: US 6,612,581 B2
(45) Date of Patent: Sep. 2, 2003

(54) BRUSH SEAL COIL FOR ROTARY MACHINERY AND METHOD OF RETROFITTING

(75) Inventors: Nitin Bhate, Clifton Park, NY (US); Mahmut Faruk Aksit, Istanbul (TR)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,227

(22) Filed: Dec. 4, 2001

(65) Prior Publication Data

US 2003/0102629 A1 Jun. 5, 2003

(51) Int. Cl.$^7$ ................................................ F01D 11/02
(52) U.S. Cl. ................................................ 277/355
(58) Field of Search ........................... 277/355, 412, 277/421

(56) References Cited

U.S. PATENT DOCUMENTS 1,596,422 A * 8/1926 Fulton ........................ 277/355
5,474,305 A * 12/1995 Flower ....................... 277/355
6,168,162 B1  1/2001 Reluzco et al.

* cited by examiner

Primary Examiner—William Miller
(74) Attorney, Agent, or Firm—Dougherty, Clements & Hofer; Tracey R. Loughlin

(57) ABSTRACT

An article for controlling flow of a fluid medium in a fluid path comprises a brush seal carrier and at least one brush seal coil disposed within the brush seal carrier. The brush seal coil is arranged in predetermined array and comprises a continuous helical member. In addition, a brush seal, for controlling the flow of the fluid medium in the fluid path, comprises a plurality of fibers secured to the brush seal coil.

29 Claims, 5 Drawing Sheets

BRUSH SEAL COIL FOR ROTARY MACHINERY AND METHOD OF RETROFITTING

BACKGROUND OF THE INVENTION

The present invention relates generally to rotary machines, and more particularly to a brush seal and to a rotary machine having a brush seal.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, labyrinth seal performance degrades over time as a result of transient events in which the stationary and rotating components interfere, rubbing the labyrinth teeth into a "mushroom" profile and opening the seal clearance.

Accordingly, there is a need in the art for a rotary machine having improved leakage control between stationary and rotating components.

SUMMARY OF THE INVENTION

One embodiment of the present invention is an article for controlling flow of a fluid medium in a fluid path comprising a brush seal carrier and at least one brush seal coil disposed within the brush seal carrier. The brush seal coil is arranged in a predetermined array and comprises a continuous helical member. In addition, a brush seal, for controlling the flow of the fluid medium in the fluid path, comprises a plurality of fibers and is secured to the brush seal coil.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
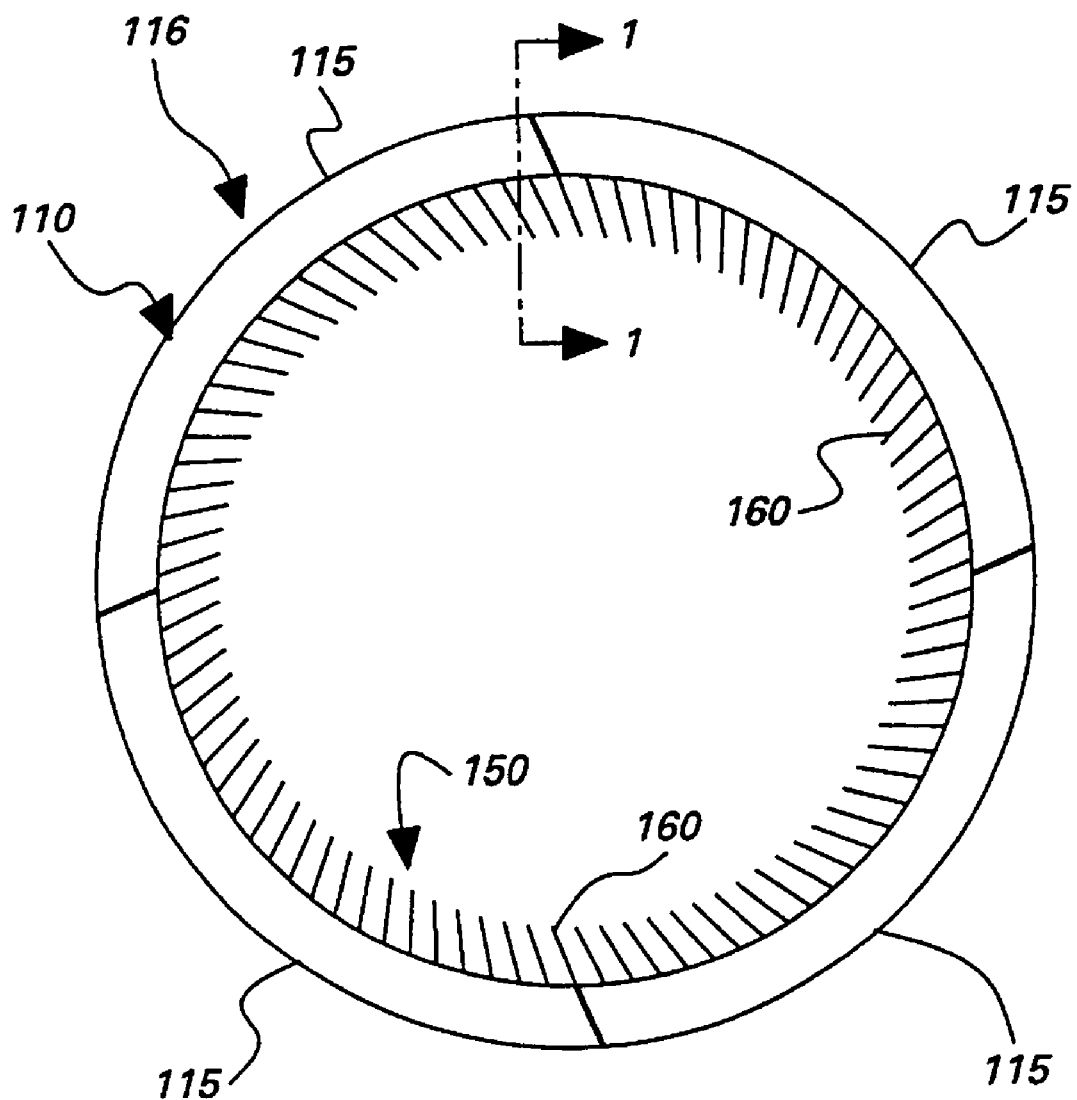
FIG. 1 is an end elevational view of a conventional segmented brush seal carrier.

Referring now to the drawings, FIG. 1 schematically shows a brush seal carrier 110 that is used in embodiments of the present invention. Brush seal carrier 110 typically comprises a plurality of brush seal segments 115 circumferentially arrayed to define an annular brush seal 116. The annular brush seal 116 is typically disposed in the annular gap between a rotating member 180, for example, a rotor, and a stationary member, for example, a turbine casing 170 (see FIG. 5). In another embodiment, the annular brush seal 116 is disposed in a rotary machine such as an electric generator or, more specifically, a hydrogen cooled electric generator. In a further embodiment, the annular brush seal 116 is typically disposed in medical equipment such as equipment employing x-ray tube devices. In a further embodiment, annular brush seal 116 is disposed in turbo-machinery such as a centrifugal compressor, a steam turbine, or a gas turbine typically used in aircraft engines or used by power utility companies. It is noted that the invention is not limited to the examples expressed herein and can also be associated with any machine experiencing a fluid pressure drop during machine operation. In addition, the annular brush seal 116 is not limited to a moving or rotating portion of the machine and can be employed between to components having no relative motion.

For purposes of describing the invention, it is understood that the terminology "annular brush seal" is an article for controlling flow of a fluid medium 200 in a fluid path. Annular brush seal 116 is part of an article such as a seal assembly, generally designated 100, which includes, without limitation, a plurality of brush seal carrier segments 115 arrayed together to form the complete annular brush seal 116 (see FIG. 1). In an alternative embodiment (not shown), the annular brush seal 116 comprises one continuous brush seal carrier 110 devoid of any brush seal carrier segments 115. In a further embodiment, annular brush seal 116 typically comprises a front plate 120 and a back plate 130 having a brush seal 150 disposed therebetween. In addition, the brush seal 116 comprises a plurality of fibers 160 disposed on a helical member 145. In some embodiments, the helical member 145 is a continuous helical member. As used herein, directional words such as, for example, "on", "in", "over", "above", and "under" are used to refer to the relative location of elements of seal assembly 100 as illustrated in the Figures and is not meant to be a limitation in any manner with respect to the orientation or operation of seal assembly 100.

Figure 5:
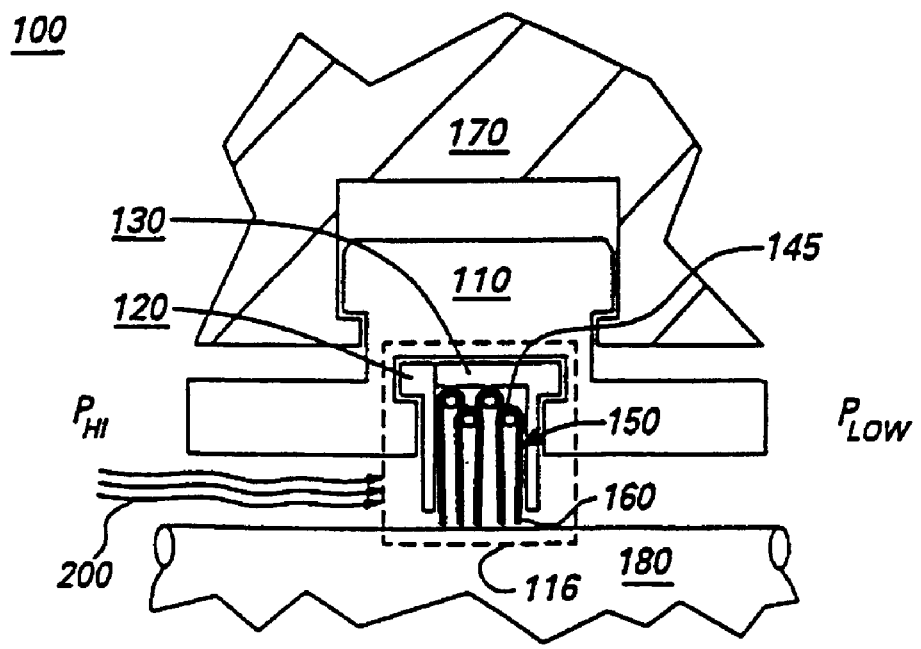
FIG. 5 is a schematic, cross sectional view of the annular brush seal of FIG. 1 taken along lines 1—1 comprising the brush seal coil of FIG. 3 in accordance with another embodiment of the present invention.

In one embodiment, as mentioned above, the annular brush seal 116 is typically disposed between the rotating member 180, for example a rotor, and a stationary member, for example, the turbine casing 170 (see FIG. 5). These components form part of a turbine in which a fluid medium 200 in a fluid path, for example, gas or steam, is passed between the rotating member 180 and turbine casing 170. When the brush seal 150 of annular brush seal 116 is disposed adjacent to rotating member 180, the brush seal 150 separates pressure regions on axially opposite sides of annular brush seal 116. For illustrative purposes, it will be appreciated, however, that fluid medium 200 in fluid path flows from the high pressure side, designated "Phi", towards the low pressure side, designated "Plow", i.e., from the left to right of drawing FIG. 5.

Figure 2:
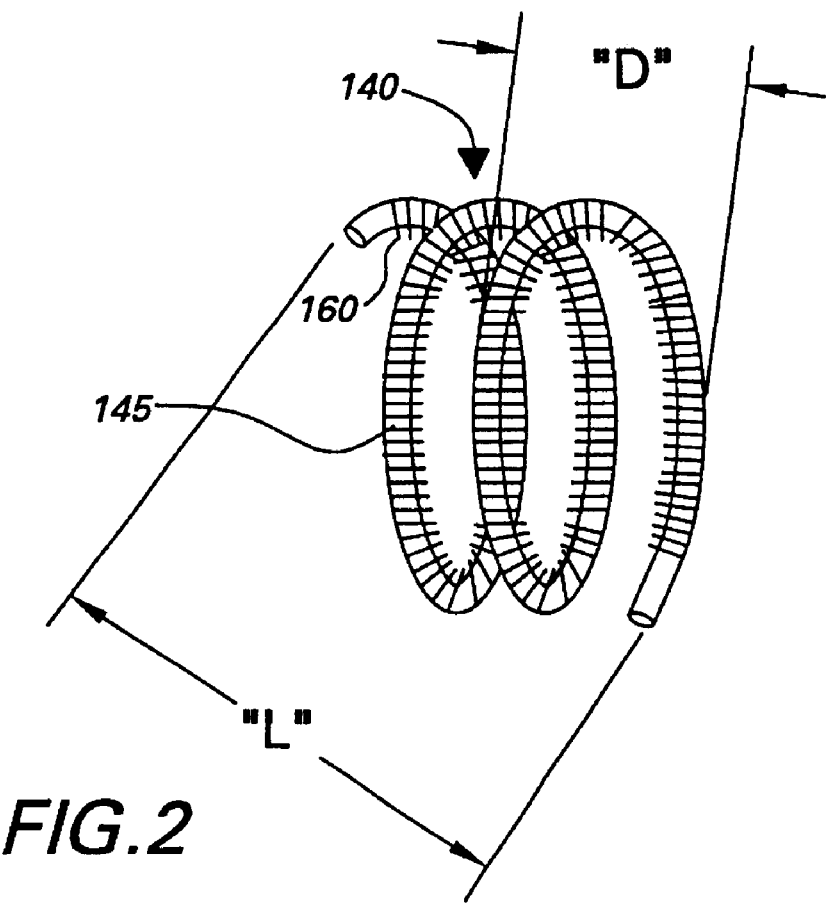
FIG. 2 is a schematic view of a brush seal coil in accordance with one embodiment of the present invention.

FIG. 2 shows a brush seal coil 140 which comprises the helical member 145, where the helical member 145 is arranged in a predetermined array. The helical member 145 has individual fibers 160, forming the brush seal 150 in their totality, secured to the helical member 145. Here, the helical member 145 is arranged in a coil shape. The term "predetermined array," as used herein, refers to the specifically designed arrangement of the coiling of helical member 145. For example, it will be appreciated that the predetermined array of brush seal coil 140 may comprise a constant diameter helical member 145, designated "D" (FIG. 2), an alternating diameter helical member 145 (FIG. 3) and an irregular diameter helical member 145 (not shown) resulting in length-wise, designated "L" (see FIG. 2), cross-sectional shapes such as a "linear shape," a "staggered shape", and irregular shapes (discussed below).

The cross-sectional shape of the helical member 145 is selected from the group consisting of square 148 (see FIG. 6), rectangular, triangular, circular 146 (see FIG. 4), polygonal, and irregular shapes. In one construction, the fibers 160 are metallic fibers, non-metallic fibers and combinations thereof. Other examples of fibers 160 are polymer fibers, carbon fibers, ceramic fibers, aramid fibers and combinations thereof. It will be appreciated that the material of helical member 145 may vary depending upon the desired spring constant when helical member 145 is formed into a coil.

Figure 4:
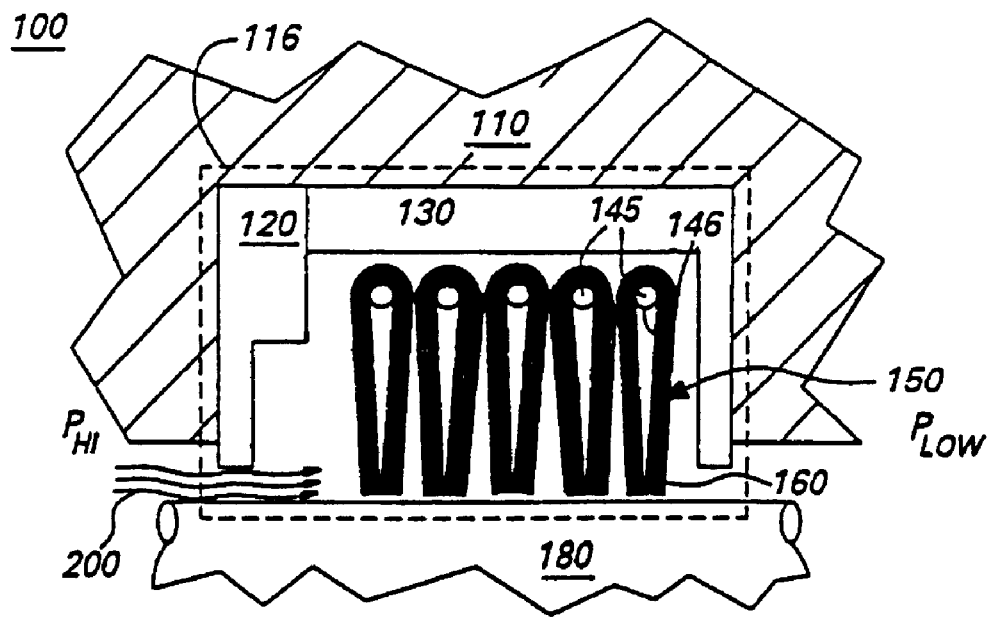
FIG. 4 is a schematic, cross sectional view of the annular brush seal of FIG. 1 taken along lines 1—1 comprising the brush seal coil of FIG. 2 in accordance with another embodiment of the present invention.

In a turbine, the brush seal coil 140 is disposed within the annular brush seal 116 so that the brush seal 150 of annular brush seal 116, when disposed adjacent rotating member 180, restricts the flow of the fluid medium 200 in a fluid path between high and low pressure regions (see FIG. 4). FIG. 4 is a cross sectional view of FIG. 1 along lines 1—1 showing brush seal carrier 110 comprising front plate 120 and back plate 130 wherein the brush seal coil 140 (as shown in FIG. 2) is disposed therebetween. In this embodiment, the cross-sectional shape of the helical member 145 disposed in the brush seal carrier 110 is a linear shape (see FIG. 4). The term "linear shape", as used herein, refers to the length-wise cross sectional shape of the brush seal coil 140 wherein each of the cross-sections of the brush seal coil 140, when viewed as a whole, are disposed next to one another in a linear manner.

Figure 3:
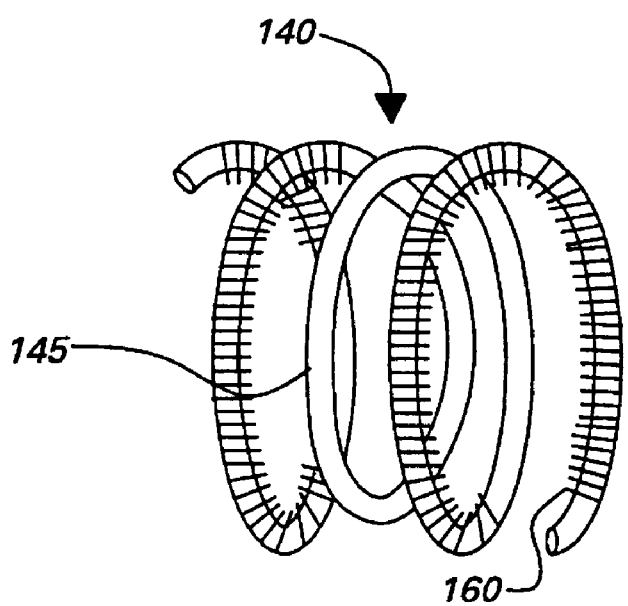
FIG. 3 is a schematic view of a brush seal coil in accordance with another mode of the present invention.
Figure 6:
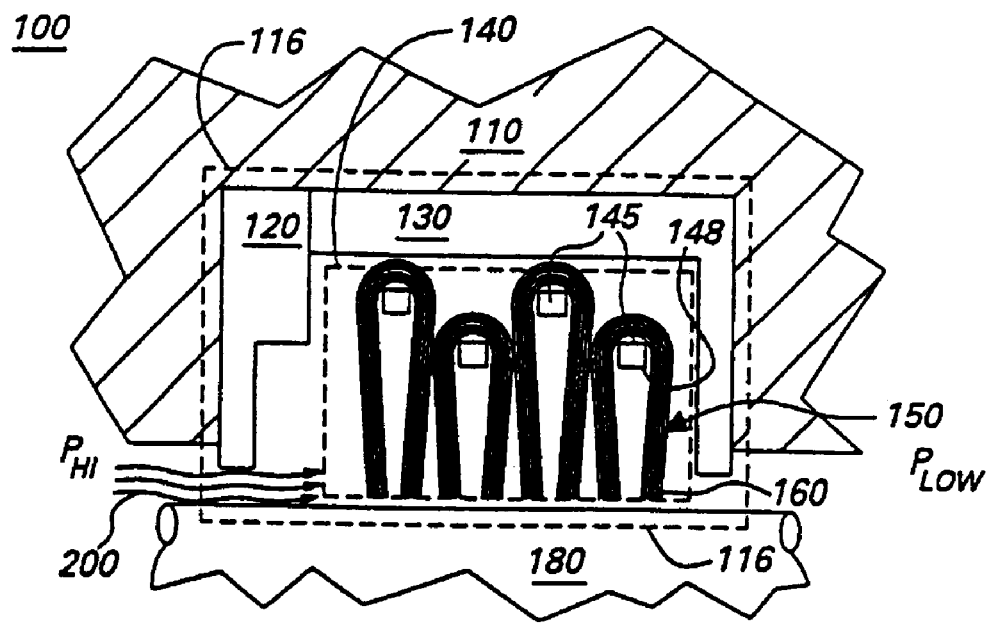
FIG. 6 is a schematic, cross-sectional exploded view of FIG. 5.
Figure 7:
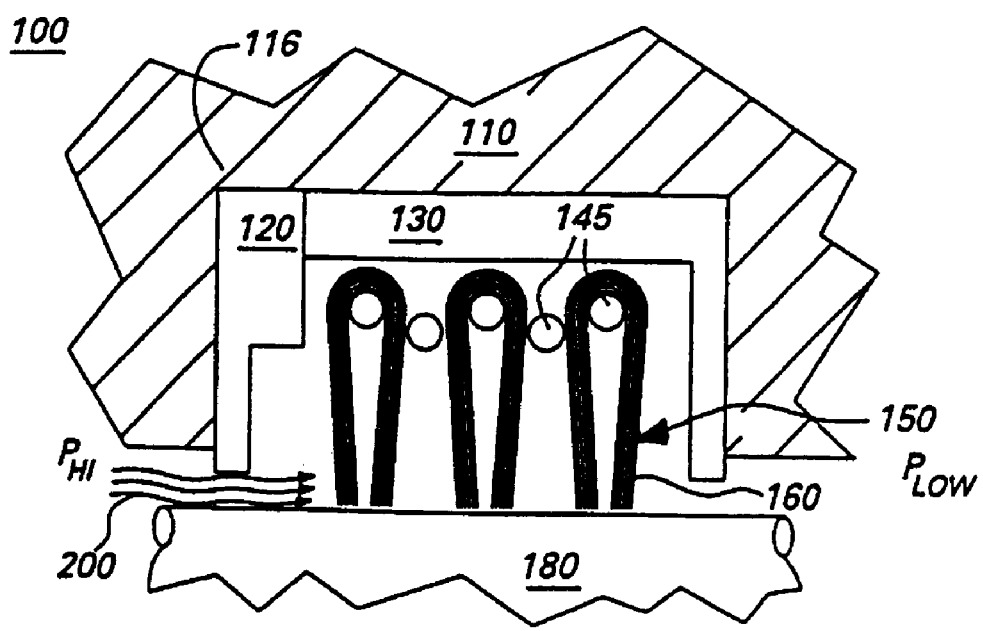
FIG. 7 is a schematic, cross-sectional exploded view of another embodiment of the present invention.
Figure 8:
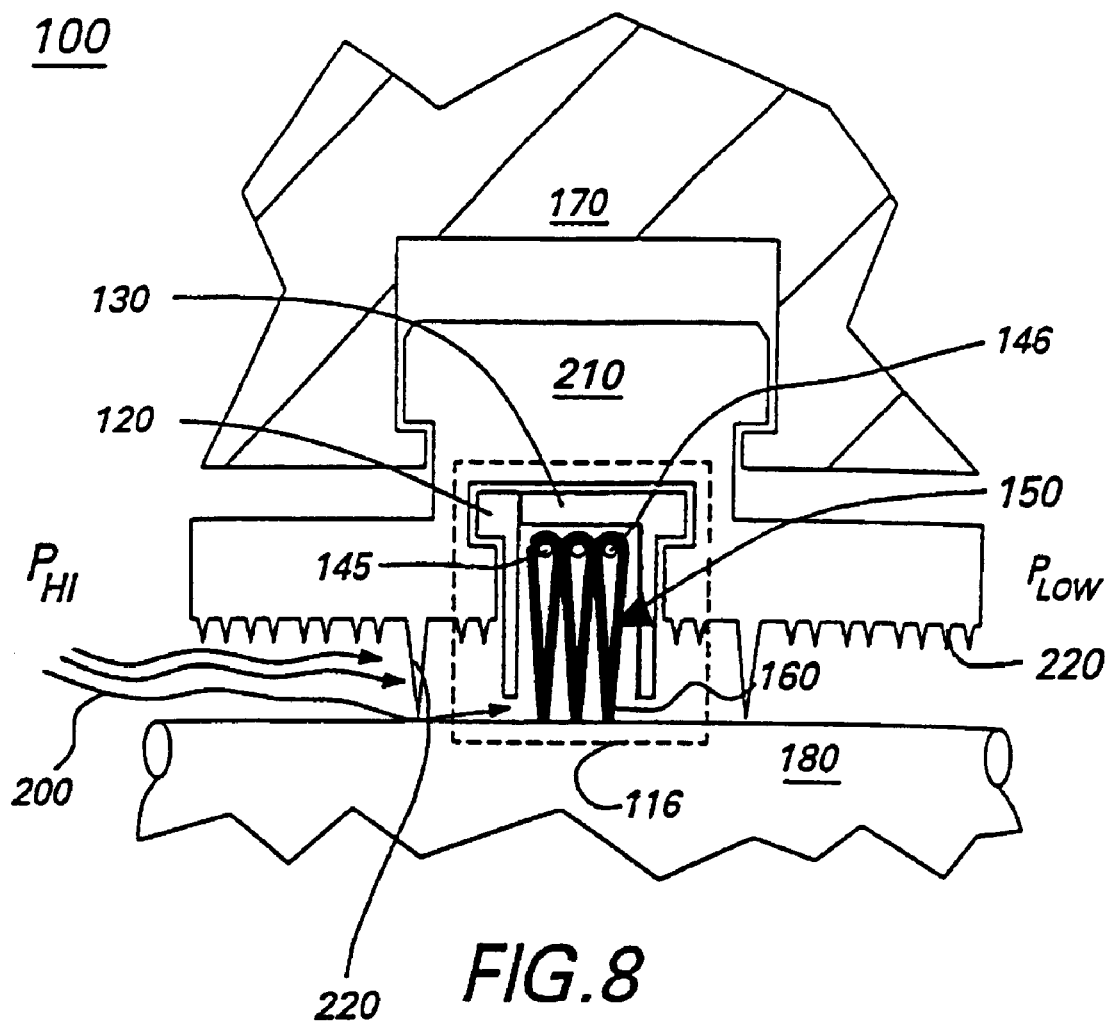
FIG. 8 is a schematic, cross-sectional exploded view of another embodiment of the present invention disposed in a labyrinth seal.

In another embodiment, FIG. 5 shows the brush seal carrier 110 comprising the annular brush seal 116 where the brush seal carrier 110 is disposed in the turbine casing 170. FIG. 6 shows FIG. 5 in more detail. Here, the brush seal coil 140 of FIG. 3 is disposed between the front plate 120 and back plate 130 of annular brush seal 116, and as an exemplary embodiment, the cross-sectional view of the helical member 145 as shown in FIGS. 5 and 6 is square. The brush seal 150, comprising the plurality of fibers 160, is disposed adjacent rotating member 180 so as to restrict the flow of fluid medium 200 in the fluid path from Phi to Plow. In this embodiment, the cross-sectional shape of the brush seal coil 140, as disposed between the front plate 120 and the back plate 130, is a staggered shape. The term "staggered shape", as used herein, refers to the length-wise cross sectional shape of the brush seal coil 140 wherein each of the cross sections of the brush seal coil 140, when viewed as a whole, are arranged in an overlapping or alternating manner. In one exemplary embodiment, the combination of the "staggered shape" brush seal coil 140 in addition to the square 148 cross-sectional shape of the helical member 145 results in enhanced compression and alignment of brush seal coil 140 when disposed between the front plate 120 and the back plate 130 of annular brush seal 116. It will be appreciated that in some designs, fibers 160 are secured to helical member 145 to form a continuous brush seal 150 (see FIG. 2), a non-continuous brush seal 150 (see FIG. 3) or an irregular brush seal 150 (not shown). The term "irregular", as used herein, refers to a non-uniform distribution of the fibers 160 on the helical member 145. FIG. 7 shows the brush seal coil 140 of FIG. 3 disposed between the front plate 120 and the back plate 130 of brush seal carrier 110. Here, the fibers 160 are secured to the surface of the helical member 145 in alternating sections so as to form the non-continuous brush seal 150. As a result, in some embodiments, gaps are created between the alternating sections of fibers 160 thus resulting in reduced turbulence of the fluid medium 200 approaching subsequent alternating sections of fibers 160. This reduction of turbulence results in a decrease of fluttering of the fibers 160 and thereby increases the life and performance of the brush seal 150. FIG. 8 shows a labyrinth seal 210, having labyrinth seal teeth 220, comprising the annular brush seal 116 disposed therein, where the labyrinth seal 210 is disposed in a turbine casing 170. Here, the cross-sectional view of helical member 145 is circular 146 and the fibers 160 of brush seal 150, in combination with the labyrinth seal teeth 220, are disposed adjacent rotating member 180 so as to restrict the flow of the fluid medium 200 in the fluid path from Phi to Plow. In this embodiment, the cross-sectional shape of the helical member 145 disposed in brush seal carrier 110 is a linear shape. It will be appreciated that a staggered shape and the methods of securing the fibers 160 in sections as described above may be used.

In operation, a method of retrofitting the seal assembly 100 in rotary machinery comprises providing the brush seal carrier 110, providing the brush seal coil 140 comprising the helical member 145, disposed within the seal carrier 110, and arranged in a predetermined array. In addition, providing the brush seal 150 comprising the plurality of fibers 160 and secured to the brush seal coil 140, and positioning the seal assembly 100 between a stationary casing such as the turbine casing 170 and the rotating member 180 such as a rotor. One advantage to such method of retrofitting the seal assembly 100 in the turbine, for example, is that seal assembly 100 is simply removed and replaced with another seal assembly 100 and down time of the turbine is thereby reduced. In some operations, such method of retrofitting allows a technician to replace seal assembly 100 without having to disassemble any major parts of the rotary machinery thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An article for controlling flow of a fluid medium in a fluid path comprising:
   a brush seal carrier;
   at least one brush seal coil comprising a helical member, disposed within said brush seal carrier, and arranged in a predetermined array; and
   a brush seal for controlling said flow of said fluid medium in said fluid path,
   said brush seal comprising a plurality of fibers secured to said brush seal coil, wherein said brush seal separates high and low pressure regions located on axially opposite sides of said brush seal, and wherein said brush seal is capable of restricting the flow of the fluid medium in the fluid path between the high and low pressure regions.

2. The article of claim 1, wherein said article comprises turbomachinery.

3. The article of claim 1, wherein said article comprises an x-ray tube.

4. The article of claim 1, wherein said article comprises rotating machinery.

5. The article of claim 1, wherein said brush seal carrier comprises at least one front plate and at least one back plate positioned so as to compress said brush seal coil therebetween.

6. The article of claim 1, wherein said brush seal carrier comprises a continuous brush seal carrier.

7. The article of claim 1, wherein said brush seal carrier comprises a plurality of brush seal carrier segments.

8. The article of claim 1, wherein the length-wise cross-sectional shape of said brush seal coil is selected from the group consisting of linear shapes, staggered shapes and irregular shapes.

9. The article of claim 1, wherein said plurality of fibers comprises at least one of metallic fibers, non-metallic fibers and combinations thereof.

10. The article of claim 1, wherein said plurality of fibers comprises at least one of polymer fibers, carbon fibers, ceramic fibers, aramid fibers and combinations thereof.

11. The article of claim 1, wherein said brush seal comprises a continuous brush seal.

12. The article of claim 1, wherein said brush seal comprises a non-continuous brush seal formed by said plurality of fibers being secured in alternating sections to a surface of said helical member.

13. The article of claim 1, wherein said brush seal comprises an irregular brush seal formed by said plurality of fibers being secured in irregular sections to a surface of said helical member.

14. A seal assembly for controlling flow of a fluid medium in a fluid path in a turbine comprising:
   a turbine casing;
   a rotating member disposed proximate said turbine casing;
   a brush seal carrier disposed within said turbine casing, said brush seal carrier comprising at least one front slate and at least one back plate;
   at least one brush seal roil comprising a continuous helical member, arranged in a predetermined array, and disposed within said brush seal carrier so as to be compressed by said front plate and said back plate; and
   a plurality of fibers secured to said brush seal coil to form a brush seal,
   wherein said brush seal controls said flow of said fluid medium between said rotating member and said brush seal.

15. The seal assembly of claim 14, wherein said brush seal carrier comprises a continuous brush seal carrier.

16. The seal assembly of claim 14, wherein carrier plurality of brush seal carrier segments.

17. The seal assembly of claim 14, wherein the cross-sectional helical member comprises a shape selected from the group consisting of square, rectangular, triangular, circular, polygonal and irregular shapes.

18. The seal assembly of claim 14, wherein the length-wise cross-sectional shape of said brush seal coil is selected from the group consisting of linear shapes, staggered shapes and irregular shapes.

19. The seal assembly of claim 14, wherein said plurality of fibers comprises at least one of metallic fibers, non-metallic fibers and combinations thereof.

20. The seal assembly of claim 14, wherein said plurality of fibers comprises at least one of polymer fibers, carbon fibers, ceramic fibers, aramid fibers and combination thereof.

21. The seal assembly of claim 14, wherein said brush seal comprises a continuous brush seal.

22. The seal assembly of claim 14, wherein said brush seal comprises a non-continuous brush seal formed by said plurality of fibers being secured in alternating sections to a surface of said helical member.

23. The seal assembly of claim 14, wherein said brush seal comprises an irregular brush seal formed by said plurality of fibers being secured in irregular sections to a surface of said helical member.

24. A method of retrofitting a seal assembly in rotary machinery comprising:
   providing a brush seal carrier;
   providing at least one brush seal coil comprising a helical member, disposed within said brush seal carrier, and arranged in a predetermined array;
   providing a brush seal comprising a plurality of fibers secured to said brush seal coil; and
   positioning said seal assembly between a stationary casing and a rotating member, wherein said seal assembly separates high and low pressure regions located on axially opposite sides of said seal assembly, and wherein said seal assembly is capable of restricting a flow of a fluid medium in a fluid path between the high and low pressure regions.

25. The method of claim 24, wherein said stationary casing comprises a turbine casing and said rotating member comprises a rotor.

26. The method of claim 24, wherein said brush seal carrier comprises at least one front plate and at least one back plate positioned so as to compress said brush seal coil therebetween.

27. The method of claim 24, wherein said brush seal comprises a continuous brush seal.

28. The method of claim 24, wherein said brush seal comprises a non-continuous brush seal formed by said plurality of fibers being secured in alternating sections to a surface of said helical member.

29. The method of claim 24, wherein said brush seal comprises an irregular brush seal formed by said plurality of fibers being secured in irregular sections to a surface of said helical member.

* * * * *

UNITED STATES PATENT AND TRADEMARK OFFICE
CERTIFICATE OF CORRECTION

| | | |
|---|---|---|
| PATENT NO. | : 6,612,581 B2 | Page 1 of 1 |
| APPLICATION NO. | : 09/683227 | |
| DATED | : September 2, 2003 | |
| INVENTOR(S) | : Nitin Bhate et al. | |

It is certified that error appears in the above-identified patent and that said Letters Patent is hereby corrected as shown below:

<u>Title Page,</u>
Item (57), Abstract, Line 4, after "in", insert --a--.

<u>Column 3,</u>
Line 11, after "designated", delete "Phi" and insert therefor --$P_{hi}$--.
Line 12, after "designated", delete "Plow" and insert therefor --$P_{low}$--.
Line 66, after "from" delete "Phi to Plow" and insert therefor --$P_{hi}$ to $P_{low}$--.

<u>Column 4,</u>
Line 37, after "from", delete "Phi to Plow" and insert therefor --$P_{hi}$ to $P_{low}$--.

<u>Column 6,</u>
Line 6, after "wherein", delete "carrier" and insert therefor --said brush seal carrier comprises a--.
Line 9, after "sectional", insert --shape of said--.

Signed and Sealed this

Twentieth Day of February, 2007

JON W. DUDAS
*Director of the United States Patent and Trademark Office*